Aug. 26, 1958 T. A. BARLETT 2,849,679
VOLTMETER
Filed Feb. 14, 1952

INVENTOR.
Theo A. Barlett
BY
Willits, Helwig & Baillio
ATTORNEYS

United States Patent Office 2,849,679
Patented Aug. 26, 1958

2,849,679
VOLTMETER

Theo A. Barlett, Flint, Mich., assignor to General Motors Corporation, Detroit, Mich., a corporation of Delaware Application February 14, 1952, Serial No. 271,604

1 Claim. (Cl. 324—131)

This invention relates to electrical measuring means and more particularly to means for measuring voltages conventionally referred to as voltmeters. Conventional voltmeters are usually designed to indicate voltages from zero to a predetermined upper limit, depending upon the desired range and scale intended. There are, however, many instances in which only a particular portion of a voltage range is of interest and that portion not being the portion adjacent zero. In those cases it is desirable to indicate only that portion which is of interest. This type of voltmeter is referred to as the suppressed zero type, and will give no indication until the voltage impressed thereon reaches the minimum value for which it is designed.

It is one of my objects in this invention to provide a suppressed zero type of voltage measuring means.

It is a further object of this invention to provide a simple and rugged type of voltmeter requiring no mechanical bias and in which the scale or range may be easily changed.

With these and other objects in view which will become apparent as the specification proceeds, my invention will be best understood by reference to the following specification and claims and the illustrations in the accompanying drawings, in which:

Figure 1:
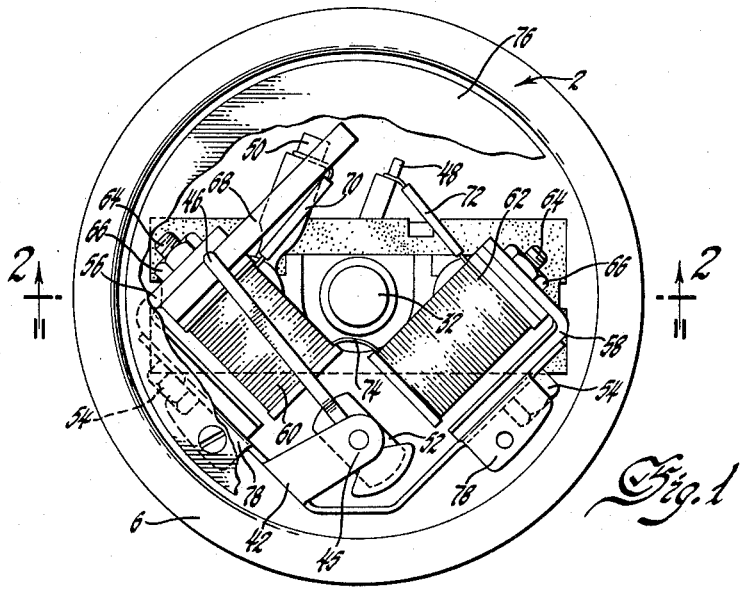
Figure 1 is a front elevational view of a voltmeter embodying my invention with the dial broken away to show the internal construction.
Figure 2:
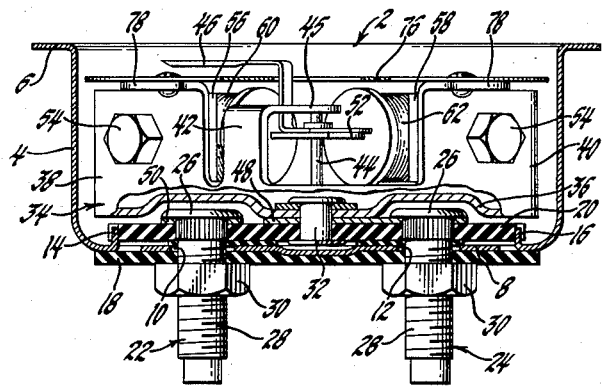
Figure 2 is a transverse sectional view through the instrument taken on the line 2—2 of Figure 1.

Referring now specifically to the construction shown in Figures 1 and 2, a main casing 2 is illustrated having a main cylindrical portion 4 and an outwardly flanged rim 6 at one end thereof for mounting purposes. The opposite end of the cylindrical case is closed by a disc-like or circular section 8 having a plurality of openings 10 and 12 therein for supporting an electrical connection means to project therethrough as will be later explained. A pair of oppositely disposed locating tangs 14, 16 are punched inwardly from this section. A pair of plates 18 and 20 formed of insulating material are mounted in parallel relation on opposite sides of the disc section 8 primarily to support a pair of mounting and supporting terminals 22 and 24 which extend through aligned openings in the plates 18 and 20, their inner ends being headed as at 26 and their outer ends being threaded as at 28 to receive clamping nuts 30. It is to be noted that openings 10 and 12 in disc 8 through which the terminals 22 and 24 project are larger in diameter than said terminals, so that there will be no physical contact therebetween.

Centrally mounted on the inner insulating plate 20 by a rivet 32 is an irregularly shaped supporting frame 34 consisting of a base section 36 and upstanding flanged sides 38 and 40 on opposite sides of the base section, which sides lie substantially at right angles to each other. A further integral upstanding arm 42 has its outer end 45 bent over parallel to the base 36. A rotatable shaft 44 upon which an indicating needle 46 is mounted is carried in bearing surfaces in the base and in the end 45. The indicating needle 46, therefore, moves in a plane parallel to the base 36. The base section 36 has portions deformed upwardly to provide clearance for the heads 26 of the terminals 22 and 24.

An electrical connector strip 48 is mounted under the head 26 of terminal 24 and is clamped between the insulating plate 20 and the base 36 of the frame, held by rivet 32. Strip 48 then extends upwardly (Fig. 1) to provide a connection point for one coil terminal. A second terminal strip 50 is mounted under the head 26 of the terminal 22 and likewise extends upwardly beyond the base 36, being spaced therefrom at all points, and has another coil terminal connected to it. The rotatable shaft also has mounted thereon a permanently magnetized bar 52 which is rigidly connected to the indicating needle and to the shaft, the three elements moving as a unit, the longitudinal axis of the magnetized bar being in substantial alignment with the indicating needle.

Secured by bolts 54 to each of the side members 38 and 40 are angle brackets 56 and 58 respectively, which in turn carry electromagnetic coil and core assemblies 60 and 62. These coil assemblies have therein core members 64 extending from one end which project through openings in the angle brackets 56 and 58 are are held thereon by securing nuts 66. These two electromagnetic coil assemblies are shown substantially at right angles to each other but may be arcuately spaced at any other angle depending upon the desired length of scale. Their longitudinal axes pass through the pivot of the indicating needle. The electromagnetic coil assembly 60 which is provided with a soft iron magnetizable core, likewise has a permanent bar magnet 68 mounted thereon, one end of which is clamped between the coil and the bracket 56 for support. This provides a permanent magnetic field for the core, this field normally attracting one pole of the bar magnet 52. The coil 60 of this electromagnetic assembly is so wound that the field produced thereby by the passage of current will oppose the permanent magnet field and if the flow of current is sufficient will reduce its magnetic effect on the magnet 52 on the indicating needle to a very small value. The passage of current through the coil 62 will, of course, create a magnetic field to magnetize its core and attract the magnet 52 on the indicator shaft. Line 70, extending from coil 60, is connected to the end of the strip connector 50 and line 72 extending from coil 62 is in like manner connected to connector 48. The two coils are wired in series, the opposite ends of the two coils being connected together by wire 74. A suitable dial 76 may be supported on ears 78 of the supporting flanges 56 and 58.

Figure 3:
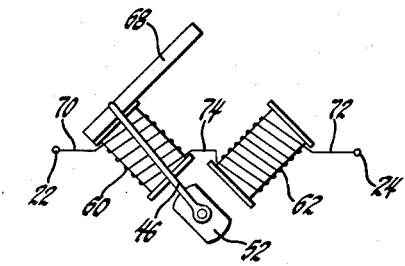
Figure 3 is a circuit diagram of the electrical system of the meter.

Referring now to Figure 3, which is a disclosure of the electrical system, and assuming that the left end of magnet 68 is magnetized, for example, as a south pole and that the lower end of the short bar magnet 52 is likewise magnetized as a south pole, then it will be seen that with no current flowing through coils 60 and 62, the residual flux or field of the core of coil 60 will attract the upper end of the bar magnet 52, which will be a north pole, and will tend to hold the indicating needle in the left-hand position shown, which will be at one end of the scale. If now a source of voltage is applied to the terminals 22, 24, the magnetic field of coil 60 will oppose or buck the permanent magnet field to reduce its power to maintain the needle in its left-hand position and at the same time the field of coil 62 will tend to attract the needle toward the right-hand side, but there will be substantially no movement at all until the magnetic field strengths have reached a predetermined value which, of course, is in turn determined by the strengths of the permanent magnet and the ampere turns of the coil windings. For example, the construction could be so designed that until a power source of at least fifteen volts had been applied across the coils, there would be no movement of the needle and until that time the effective strength of the permanent magnet field would be sufficient to hold the needle at the low end of the scale. Above that voltage, however, the strength of the permanent magnet residual field would be reduced and the strength of the electromagnetic coil assembly 62 increased to move the bar magnet 52 in a clockwise direction until such voltage was applied as to cause the bar magnet to lie substantially in alignment with the core 64 of the electromagnetic assembly 62. For example, the scale might be designed to read from fifteen to fifty volts, as this would be the range of interest for this particular construction. Any range, of course, may be provided by determining the proper values of the magnetic windings and permanent magnets.

Minor adjustments for properly setting to the ends of the scale may be accomplished by adjusting the position of the coils through loosening bolts 54 and adjusting the position of the electromagnetic coil assemblies with respect to the permanent magnet 52 on the indicating needle shaft. In order to change the complete scale reading of the device, a variation in the number of turns on either or both coils will result in a new scale and range. Also, external shunts or series resistors can be used.

I claim:

In an electrical meter, a frame, permanently magnetized indicating means rotatably mounted about a pivot on said frame and movable over a scale from a zero position, a first electromagnetic assembly including a coil and a magnetizable core mounted on said frame, said core having its longitudinal axis extending through the pivot of the magnetized indicating means and providing a magnetic field, when energized, to rotate the magnetized indicating means upscale from zero, a second electromagnetic assembly including a coil and core, said second electromagnetic assembly being mounted on said frame at an angle to the first electromagnetic assembly and having the longitudinal axis of its core substantially aligned along the zero position of said indicating means and intersecting the longitudinal axis of the core of said first electromagnetic assembly at the pivot of the magnetized indicating means, said cores being in substantially the same plane as said magnetized indicating means and said coils being electrically connected in series, and a permanent magnet having one of its poles contacting the core of said second electromagnetic assembly and having a polarity such as to create a magnetic field to attract said magnetized indicating means to its zero position, said second electromagnetic means providing, when energized, a field opposing that of the permanent magnet to neutralize the same and permit the first electromagnetic assembly to attract the magnetized indicating means upscale when the two coils are energized.

References Cited in the file of this patent

UNITED STATES PATENTS

| | | |
|---|---|---|
| 1,791,786 | Bacon | Feb. 10, 1931 |
| 2,178,108 | Schwarze | Oct. 31, 1939 |
| 2,181,960 | Bacon | Dec. 5, 1939 |
| 2,358,910 | De Giers | Sept. 26, 1944 |
| 2,419,612 | Warshaw | Apr. 29, 1947 |
| 2,603,730 | Pethes | July 15, 1952 |